A. L. BAUSMAN.
CONFECTIONERY MOLDING MACHINE.
APPLICATION FILED DEC. 28, 1918.
1,323,949.
Patented Dec. 2, 1919.
4 SHEETS—SHEET 1.
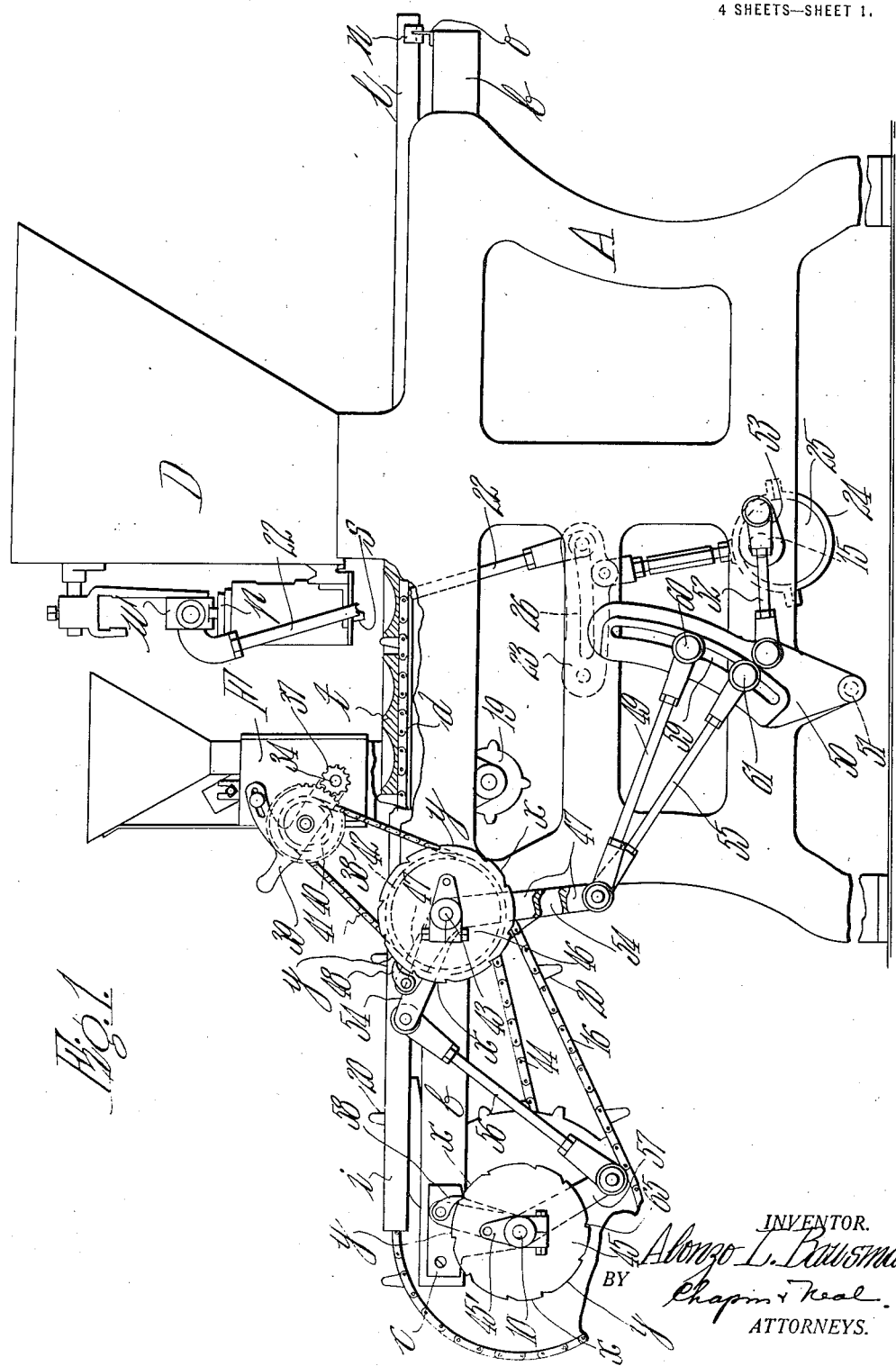
INVENTOR.
Alonzo L. Bausman
BY
Chapin + Neal
ATTORNEYS.

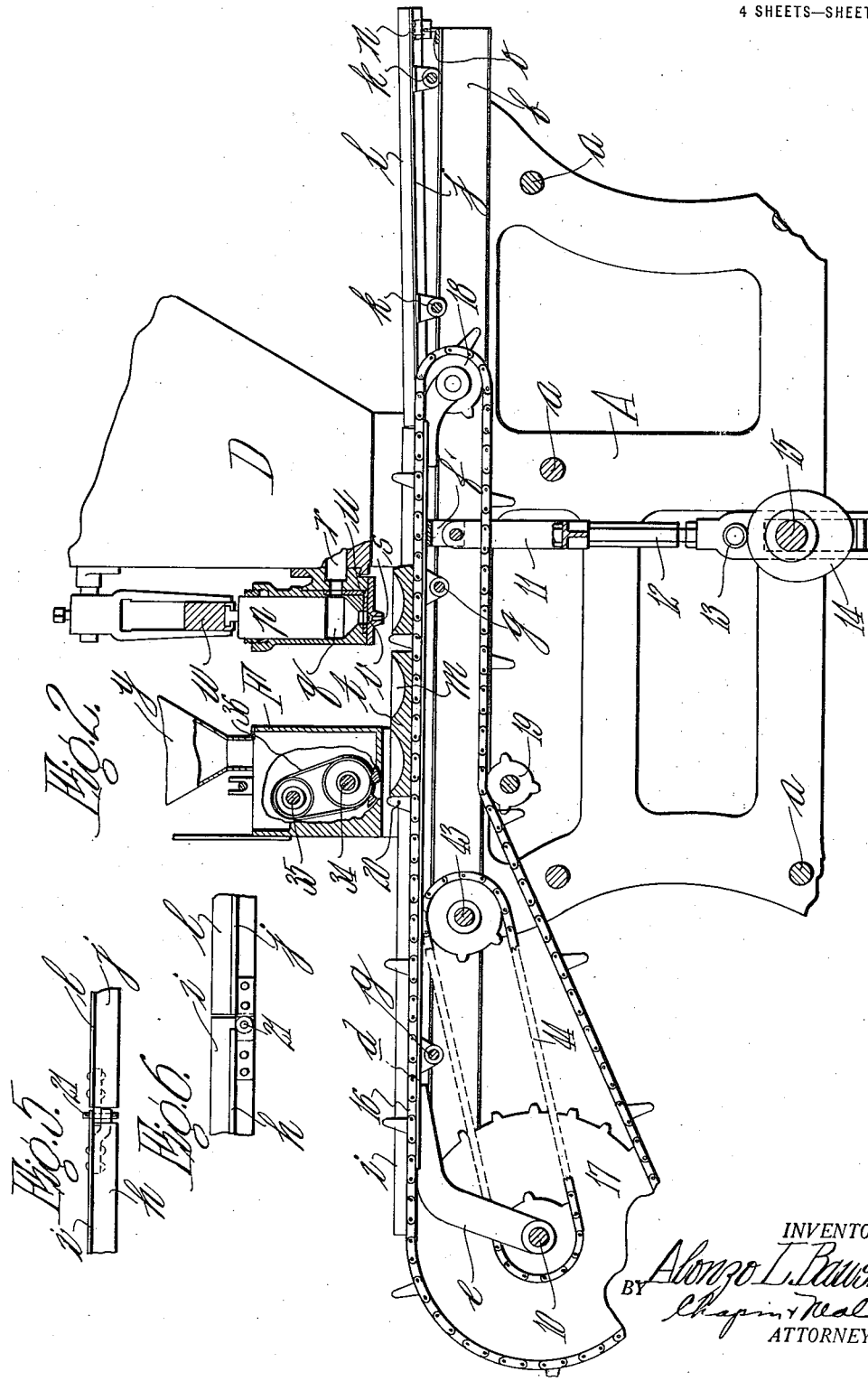

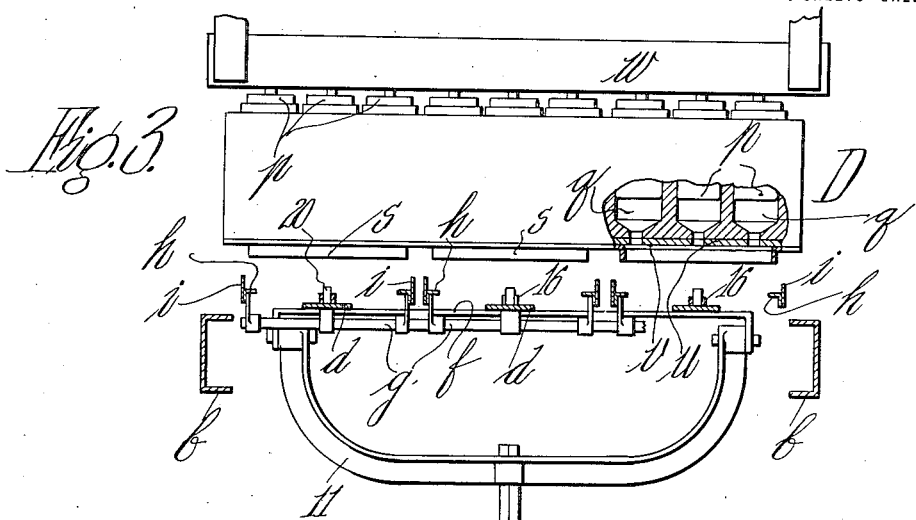

A. L. BAUSMAN.
CONFECTIONERY MOLDING MACHINE.
APPLICATION FILED DEC. 28, 1918.

1,323,949.

Patented Dec. 2, 1919.
4 SHEETS—SHEET 4.

INVENTOR.
Alonzo L. Bausman.
BY Chapin & Neal
ATTORNEYS.

UNITED STATES PATENT OFFICE.

ALONZO LINTON BAUSMAN, OF CHICOPEE, MASSACHUSETTS, ASSIGNOR TO NATIONAL EQUIPMENT COMPANY, OF SPRINGFIELD, MASSACHUSETTS, A CORPORATION OF MASSACHUSETTS.

CONFECTIONERY-MOLDING MACHINE.

1,323,949.  Specification of Letters Patent.  Patented Dec. 2, 1919.

Application filed December 28, 1918. Serial No. 268,737.

*To all whom it may concern:*

Be it known that I, ALONZO LINTON BAUSMAN, a citizen of the United States of America, residing at Chicopee, in the county of Hampden and State of Massachusetts, have invented certain new and useful Improvements in Confectionery-Molding Machines, of which the following is a specification.

This invention relates to an improved confectionery molding machine for molding bars of chocolate or the like, and particularly to machines of this class in which nuts, or other material of a generally similar nature, may be molded with the chocolate. A familiar example of the product of the machine is the chocolate nut bar.

Chocolate molding machines in which provision is made for the insertion of nuts, or the like, in the molded articles have heretofore been used. Examples of such machines are shown in U. S. Letters Patent No. 1,084,300 and No. 1,110,404, both granted to E. L. A. Savy and dated January 13, 1914, and September 15, 1914, respectively. According to the latter patent, the nuts are inserted in the molds after the chocolate has been placed therein, and, with such a scheme, the nuts require considerable rearrangement after their deposition in the molds. The nuts require to be worked or kneaded into the chocolate. According to the first-named Savy patent, the nuts are laid in the molds first and the molds are thereafter flooded with chocolate. With this machine, the molds travel continuously and the spaces between successive molds must needs be very small to avoid a deposit of nuts on such spaces and outside the mold where they are not desired. Nuts deposited on such spaces may be scraped back into the molds, but this operation destroys the desired uniform mixing of the nuts in the molded chocolate, particularly where molds with appreciable spaces therebetween are used. Moreover, the molds must be entirely filled with chocolate.

According to one feature of this invention, a nut bar depositor is provided, which may be used efficiently with existing mold equipment. Confectionery manufacturers are already supplied with mold equipment and are loath to provide additional mold equipment to suit the confectionery molding machine. The machine, of this invention, is characterized by the provision of means to adapt the machine to the candy manufacturer's existing mold equipment rather than to force the manufacturer to provide special molds to suit the machine. Existing mold equipment naturally varies widely and the prior art devices noted are hardly adapted to cope with such equipment. With my machine, the desired result is obtained by making the nut feeder and depositor deliver intermittently to the molds and in timed relation with the travel thereof and the travel of the molds is readily regulable relatively to the nut feeder and depositor to suit the requirements of various kinds of molds.

According to another feature of the invention, the same mold may be advantageously used within material limits for articles of different sizes or weights. Thus, without increasing the mold equipment, the product from the same mold may vary in size and weight. This result is accomplished by arranging the machine to deposit a measured quantity of nuts and chocolate and means are provided for conveniently varying such measured quantities so that, for example, a quantity, less than the mold will hold, may be deposited. During the delivery intervals of the nut feeder and depositor, a relative horizontal movement takes place between such elements and the molds for the purpose of spreading the nuts and chocolate over the bottom of the mold in an even layer or sheet. The depositor is also provided with wide sheet forming nozzles to laterally spread the material, the better to effect the result. The chocolate and nuts thus deposited require less rearrangement in the molds than is required in prior machines with which I am familiar.

If chocolate at the proper molding temperature is deposited in the molds, without the use of the sheet forming nozzle and without the relative horizontal movement described, the chocolate will pile up in the molds and further means would be necessary to make the material take the shape of the mold. If nuts are to be mixed with the chocolate, they would not be uniformly mixed except by special mixing apparatus, which I particularly desire to avoid.

Other features of my invention will appear in the following description and in the illustrative embodiment of the invention in the accompanying drawings, in which—

Figure 1 is a side elevational view of a depositor embodying the invention;

Fig. 2 is a longitudinal sectional view thereof, with parts broken away and with the nut feeder, in particular, largely broken away to reveal details of its driving mechanism;

Fig. 3 is a fragmentary cross-sectional view taken on Fig. 2;

Fig. 4 is an enlarged sectional elevational view of the nut feeder;

Figs. 5 and 6 are fragmentary plan and side elevational views respectively, illustrative of a detail of the trackways of the depositor.

Figure 7:
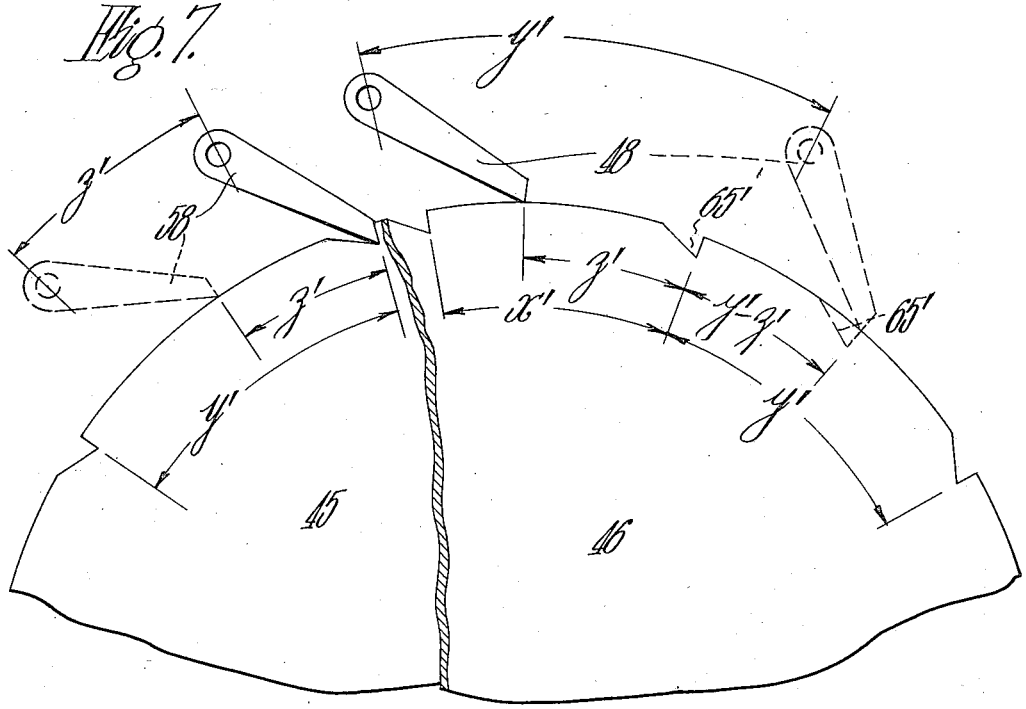
Figs. 7 and 8 are diagrammatical views, illustrative of the operation of the mold feeding mechanism.

Referring to these drawings: The machine, in general, includes,—a depositor for chocolate or the like, provided with special nozzles to emit wide and relatively thin sheets or streams of chocolate and provided with means to vary and regulate the amount of chocolate to the end that a measured quantity thereof is delivered during each cycle of operation; a nut feeder similarly arranged to deliver a measured quantity of nuts; supporting and guiding means upon and along which trays, containing molds to be filled with nuts and chocolate, may travel first to the nut feeder and then to the depositor; tray propelling mechanism to move the trays along the supporting and guiding means; mechanism to lift the trays toward the depositor nozzles during the delivery interval thereof; and actuating mechanism for the tray propelling means to move the molds in coördinated relation with the depositor and nut feeder.

The several elements described are all mounted on a suitable main frame, which, as illustrated, consists of two laterally spaced side frames A, suitably connected by cross-bars $a$ (Fig. 2). Suitably connected to, and arranged adjacent, each side frame A is a longitudinally extending channel iron $b$, which for the present purposes may be considered as a fixed part of the adjacent side frame A. These channels $b$ support, by means of brackets $c$, a shaft 10 which is arranged near the left or entrance end of the depositor. Between the channels $b$ and arranged in spaced parallel relation therewith are a series of bars $d$ (Fig. 3),—as illustrated the series consists of three bars. Each of these bars is supported at one end by a bracket $e$ (Fig. 2) from the described shaft 10, the bracket having a loose engagement with the latter so that the bars, as will appear, may swing about shaft 10 as an axis. The bars $d$, at their other ends, are connected together by a cross-bar $f$ (Fig. 3) and the cross-bar is supported at its ends by a U-shaped yoke 11, which is movable to raise and lower bars $d$, as will later appear. Each bar $d$ has secured to its underside at least two longitudinally spaced cross-bars $g$ (Figs. 2 and 3) and these bars support, as shown in Fig. 3, angle-shaped trackways $h$. The trackways $h$ are arranged in pairs, one pair for each bar $d$, and upon the pairs of trackways the trays, containing the molds, are arranged to ride. Secured to the trackways are upstanding plates $i$ which constitute lateral guiding means for the trays. The three pairs of angle bars $h$ constitute the supporting means for three series of trays and the parts $i$ constitute the guiding means for such trays.

The U-shaped yoke 11, described, is centrally supported by an upstanding member 12 and such member carries a roll 13 (Figs. 2 and 3), which rides upon the periphery of a cam 14, fixed on a shaft 15, mounted in frames A. The lower end of member 12 is forked to engage the shaft 15 for guiding purposes, as best shown in Fig. 2. The shaft 15 is the main power shaft of the depositor and it will readily be seen that, as this shaft rotates, the tray supporting and guiding means will be intermittently raised and lowered. The mechanism described constitutes the means for lifting the trays toward the depositor nozzles during the delivery intervals thereof, as will later be described in detail.

The tray propelling means consists of chains 16, one for each of the three sets of trackways $h$. The chains 16 are driven from sprockets 17 on the shaft 10 and travel, in their upper lap, over the described bars $d$, returning over idler sprockets 18, supported by the right hand ends of bars $d$, and other idler sprockets 19 supported by frames A, all as clearly shown in Fig. 2. Lugs 20 are provided on chains 16, at suitable intervals, to engage trays $t$ and propel them along their trackways. The chains 16 travel to the right, as viewed in Fig. 2, and carry the trays to, and deliver them upon, delivery trackways $j$, upon which the trays are moved by abutment with preceding trays to the delivery end of the depositor. The trackways $j$ are similar in construction to the trackways $h$ and are alined therewith, as indicated in Figs. 5 and 6. The several trackways $j$ are connected together by at least two cross-bars $k$ (Fig. 2) and each trackway has an upstanding guide plate $l$, similar to the plates $i$, already described. Each trackway $j$ is pivotally connected at one end to the adjacent end of the trackway $h$ with which it is alined, as indicated at 21 in Figs. 5 and 6. The other ends of two trackways $j$ (one adjacent each channel $b$) are arranged to slide in suitable slots in blocks $n$, such blocks being carried by a laterally extending angle iron $o$, the ends of which are supported by the channels $b$. Thus, the mounting of the delivery trackways is such as to permit the desired rise and fall of the trackways $h$ and yet both trackways are always connected for the uninterrupted passage of trays $t$ from one to the other.

The depositor for chocolate, or the like, is indicated generally by D, and, as illustrated, is of the general type disclosed in U. S. Letters Patent No. 661,008, granted October 30, 1900 on an invention of Gabriel Carlson. This type of depositor is generally well understood in the art and the present description will be confined to a disclosure of such elements of the depositor, as are necessary to an understanding of the present invention. The depositor includes a series of pistons $p$ (Fig. 3), each reciprocable in a cylinder $q$ (Fig. 2) to expel chocolate received from the outlet $r$ through the nozzles $s$. There is provided also the usual cut off bar $u$ (Fig. 2) which closes off the nozzles $s$ from cylinders $q$ during the upward or suction stroke of pistons $p$. The operation of the bar $u$ and a disclosure of its actuating mechanism is not essential to the present invention and, since this is fully disclosed in the above-mentioned Carlson patent, it will not be further considered here.

The depositor D does, however, include certain special structure to render it suitable for the contemplated use. This special structure includes the grouping of several pistons $p$ to deliver into a common nozzle $s$. As shown in Fig. 2, the latter is narrow and, as shown in Fig. 3, it is quite long, being substantially as long as the molds $m$ of trays $t$ are wide, as indicated by the fact that each nozzle $s$ extends nearly from one guide plate $i$ of a pair to the other. Each nozzle $s$ is, as illustrated, arranged to receive the discharge from three cylinders $q$ (Fig. 3), the several cylinders for each nozzle being connected by a channel $v$ (Figs. 2 and 3) beneath the cut off bar $u$, so that the material from the round cylinders $q$ may spread and subsequently emerge from the nozzle in a wide thin sheet, which is substantially coextensive in width with the molds $m$. Thus, it is insured that the material will be uniformly distributed laterally of the molds.

The several pistons $p$ are connected together by a cross-bar $w$, suitably guided for vertical reciprocation, as indicated in Fig. 2. The bar $w$ is reciprocated from the described power shaft 15. Thus, as shown in Fig. 1, at least one end of bar $w$ is connected by a link 22 to a rocking lever 23 and this lever is connected to the strap 24 of an eccentric 25 fixed on shaft 15. The connection of link 22 to lever 23 is an adjustable one, so that the stroke of pistons $p$ may be varied at will to change the measured quantity of material delivered thereby. Thus, the lever 23 is provided with a slot 26 curved concentrically with the pivotal connection of link 22 with bar $w$, so that, when the parts are positioned, as in Fig. 1, the link 22 may be moved relatively to lever 23 without altering the position of the pistons in their cylinders. The pistons $p$ have been shown in lowered position,—that is at the end of their delivery stroke,—and it will be obvious that each rotation of shaft 15 will cause one cycle of operation of pistons $p$, such cycle being subdivided into suction and delivery strokes.

The depositor for nuts or the like, or the nut feeder, indicated generally by F, is supported by and bridges across the side frames A and is located so that the molds $m$ travel in under the feeder F before they reach the nozzles $s$. The feeder F, as shown in Fig. 4, comprises a container $y$, for nuts or the like, and a rotatably mounted carrier wheel 27, which has a series of pockets $z$, angularly spaced about its periphery and each designed to receive from the container $y$, and deliver to a mold $m$, a measured quantity of nuts. The length of each pocket $z$ is substantially coextensive with the width of molds $m$ and there are, of course, several series of these pockets $z$, one series for each pair of trackways $h$. At the outlet of container $y$ is a pivoted valve plate 28 and an adjustable brush 29 coöperates with such plate to regulate the flow of nuts from the container. The plate 28 is intermittently raised to engage the brush and close off the outlet of container $y$ by successive engagement with one of the radial sides of the pockets $z$. A rotary brush 30 is mounted to engage the periphery of wheel 27 and sweep back any excess of nuts from one pocket into the next, so that each pocket is filled just flush with the periphery of wheel 27. The bottom walls of pockets $z$ are adjustable to vary the amount of nuts deposited therein from the container and thus the measured quantity delivered to molds $m$. Such bottom walls are formed by plates 31, which may be moved radially inwardly by screws 32 threaded into the wheel 27, and springs 33 tend to move the plates radially outwardly to the extent permitted by the heads of screws 32.

The driving mechanism for the feeder F will now be described. Referring to Fig. 2, the shaft 34 of wheel 27 is connected to the shaft 35 of brush 30 by a belt 36 and suitable pulleys, so that both brush and wheel rotate in the same direction. Referring now to Fig. 1, the shaft 34 has, on its other end, a pinion 37, which is driven by a gear 38, mounted on a bracket 39. Mounted on the latter co-axially with gear 38 is a sprocket 40, which is driven by a chain 41 from a sprocket 42 fixed on a shaft 43 mounted in the side frames A. The bracket 39 is pivoted on shaft 34 and may be swung on the latter as an axis to adjust the tension of chain 41, suitable means being provided, as indicated, to hold the bracket in the various positions to which it may be moved. The shaft 43, as shown in Fig. 2, is connected to shaft 10 by a chain 44 and suitable sprockets in such a manner that both shafts move at the same speed. Thus, the nut feeder is driven from the mold propelling means, and the various driving connections described are arranged to proportion the peripheral speed of wheel 27 to the surface speed of molds $m$, so that delivery of nuts is made during the travel of the molds thereunder and so that the non-delivery intervals occur during the passage of the spaces between the molds $m$. The speed of the latter is not necessarily continuous, although it is substantially so, and the speed, even if continuous, is not necessarily uniform, the molds being arranged to move in a special manner as will shortly be described. Whatever the movement of molds $m$, however, it will be seen that the wheel 27 must necessarily move in a corresponding manner.

The actuating mechanism for the mold propelling means will now be described with reference to Fig. 1. This mechanism is of the pawl and ratchet type and includes two exactly similar ratchet wheels 45 and 46 mounted on shafts 10 and 43 respectively. The ratchet 45 is loosely mounted on shaft 10, but is secured to an arm 45' which may be clamped to the shaft in an obvious manner. The ratchet 46 is similarly mounted on its shaft 43 and it will therefore be seen that each ratchet is angularly adjustable on its shaft. Both ratchets are arranged to be driven from the power shaft 15 already described. Thus, adjacent ratchet 46, a bell crank lever 47 is fulcrumed intermediate its ends on shaft 43, one end of the lever carrying a pawl 48 to engage the ratchet 46. The lower end of lever 47 is connected by a link 49 to a rockable lever 50, pivoted at 51 to one of the side frames A. The lever 50 is connected by a link 52 to a crank 53, which is fixed on shaft 15. Adjacent the bell crank lever 47, and loosely fulcrumed intermediate its ends on shaft 43, is a second bell crank lever 54, the lower arm of which is connected to the rockable lever 50 by a link 55. The upper arm of lever 54 is connected by a link 56 to the lower arm of a bell crank lever 57, which is fulcrumed intermediate its ends on shaft 10. The upper end of lever 57 bears a pawl 58 to engage the ratchet 45. The connections of both links 49 and 55 with the lever 50 are adjustable so that the throw of either pawl 48 or 58 may be varied within material limits. Thus, the lever 50 is provided with a slot 59, which is curved concentrically from the pivotal connection of both links 49 and 55 with their respective levers 47 and 54. The links 49 and 55 have studs 60 and 61 which ride in slot 59 and may be held to the lever 50 in any of the various positions to which they may be moved. The arrangement described is such that the throw of either pawl 48 or 58 may be varied without altering its position with relation to its ratchet wheel.

It will be obvious that the pawls 48 and 58 work in alternation so that one moves on its clockwise driving stroke while the other moves on its counterclockwise return stroke. As shown in Fig. 1, the pawl 58 has just reached the end of its driving stroke, and pawl 48 the end of its return stroke. During the next half revolution of shaft 15, the pawl 48 will move through its driving stroke and pawl 58 through its return stroke. During this same half revolution of shaft 15, the pistons $p$ will ascend and the trackways $h$ will remain in their lower positions. During the remaining half revolution of shaft 15, the pistons $p$ will descend and eject chocolate or the like from nozzles $s$ and the trackways $h$ will be gradually elevated toward the nozzles $s$ at the start of the delivery stroke of the pistons and will be lowered near the end of such stroke. The pawl 48 will move idly on its return stroke during the feeding movement of pistons $p$ while pawl 58 will operate on its driving stroke. The pawl 58 and ratchet 45 effect the relative horizontal movement between the depositor nozzles $s$ and molds $m$ during the delivery interval of the nozzles. This effects the spread of the chocolate over the nuts previously deposited by the feeder F which is coördinated with the mold feeding mechanism as already described.

Before further considering the operation of the depositor, a detailed understanding of the pawl and ratchet feed will be necessary. Both ratchets 45 and 46 are identical in construction and one only need therefore be described. The construction of each ratchet will, of course, vary in accordance with the requirements of each particular case. That is, the arrangement of the ratchet teeth is dependent upon the number of molds per tray, the spacing of the trays one from another, the spacing of the molds one from another within a tray, and the extent of the mold, all these dimensions being taken in the direction of the mold feeding movement. Knowing these various factors, the ratchet is laid out in the following manner. The angular movement of the drive shaft 10,—necessary to move the chains 16 through a distance equal to that obtaining between adjacent lugs 20,—is first determined. In the present case, one-fifth of a revolution of shaft 10 is required for this purpose, and, since both ratchets turn at the same angular velocity as that of the shaft 10, one-fifth of a revolution of the ratchets will move a tray a distance equal to its own length plus the space obtaining between adjacent trays. The periphery of the ratchet is then laid off into ratchet teeth. As shown, one-fifth of the circumference is divided into parts, or a series of teeth, by notches 65 corresponding in number to the number of molds per tray. For each series of teeth the angular spacing of the notches 65, or the angular extent of the ratchet teeth, is the same except for one tooth which is slightly longer than the others. The small tooth of each series is designated $x$ and the long tooth of each series is designated $y$. As shown, five such series are provided for each ratchet, each series having one tooth $x$ and one tooth $y$. The angular extent of teeth $x$ and $y$ is represented by dimensions $x'$ and $y'$ (Fig. 7) and the shaft 10, when turned through an angle $x'$, will move the tray $t$ a distance $x''$ equal to that obtaining between the centers of adjacent molds $m$. The shaft 10, when turned through the angle $y'$, will move the tray $t$ by a slightly larger increment $y''$ equal to the distance obtaining between the center of the last mold $m$ in one tray $t$ and the first mold $m$ in the next succeeding tray $t$.

The one ratchet described may be used with the pawl 48 to effect a step-by-step feed of the molds in the usual way. A consideration of the usual operation, with the ratchet 46 and pawl 48 alone, will be helpful in understanding the operation of the present invention. Assuming for the moment that pawl 58 is disconnected so as to render its ratchet 45 inoperative, then the pawl 48 will, on each forward stroke, move the trays $t$ a distance $x''$ equal to that obtaining between the centers of molds $m$. The angular throw of pawl 48 is made somewhat larger than the angle $x'$ and at least equal to the angle $y'$. Thus, ordinarily, there will be a slight forward movement of pawl 48 before ratchet 46 is moved, but this is purposely provided to permit the extra long increment of movement $y''$ to be periodically effected. Thus, after the tray $t$ has been moved by a series, (in this instance only one, although more may be and often are used) of small increments $x''$, the pawl 48 in its rearward stroke traverses the longer tooth $y$ and on its succeeding forward stroke starts to move the ratchet 46 at a slightly earlier period in its stroke than before, and thus moves the ratchet through the greater angle $y'$.

The foregoing operation is the usual one and this invention is characterized by the addition of a second feeding means, effective during the idle or return movement of pawl 48. The operation of the combination of pawls and ratchets can best be understood by considering Fig. 7. In this figure, the two ratchets 45 and 46 which, as has been pointed out, are identical in construction and move at the same angular velocity, are imagined for convenience to be fixed on the same shaft. The throw of pawl 48 is the same as heretofore described,—that is, its throw is sufficient of itself to move the molds $m$ the required distance if the second pawl 58 and ratchet 45 were omitted. The throw of the second pawl 58 is adjusted so that it will turn the ratchet 45 a fractional part of the angle $x'$, say the angle $z'$. The angle $z'$ is that necessary to turn shaft 10 to cause a movement of the trays $t$ substantially equal to the length of a mold $m$, as the distance $z''$ (see Fig. 8).

The movement of the ratchet 45 imparted by pawls 58 is really stolen from pawl 48. That is, pawl 48, but for pawl 58, is effective to move the ratchet 46 the whole distance, but pawl 58 creeps in during the idle movement of pawl 48 and moves the ratchet 45, and thus ratchet 46, part of the distance which it would otherwise have been moved by pawl 48. This will be clear from Fig. 7, wherein pawl 58 has just completed its feeding stroke and pawl 48 is about to start on its feeding stroke. Pawl 58 has turned the ratchet 45 clockwise through an angle $z'$ while pawl 48 has moved from the full line into the dotted line position. The notch 65', in which pawl 48 would have engaged shortly on its feeding stroke, has been moved forwardly through an angle $z'$ so that it will not be engaged until the latter part of the feeding stroke of pawl 48. The angular movement effected by pawl 48 is then ordinarily $x'$ minus $z'$, except that periodically, when the pawl 48 in its return movement traverses the longer tooth $y$, an extra movement is obtained as described, the angular movement of ratchet being then $y'$ minus $z'$, as shown.

Figure 8:
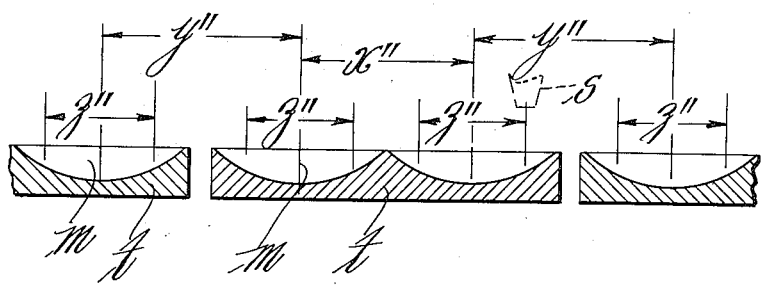

According to prior practice, as more particularly exemplified by the Carlson patent above mentioned, the step by step mold feeding means (corresponding substantially with the pawl 48 and ratchet 46) moves the trays $t$ so that the molds $m$ successively come to rest centrally beneath the nozzles $s$. That is, the pawl and ratchet device is originally adjusted relatively to the tray conveying chains to bring the center of one lateral series of molds under the nozzle. According to this invention, the original adjustment of the pawl 48 and ratchet 46 relatively to chains 16 is so made that, except for pawl 58 and ratchet 45, the trays would be moved so that succeeding molds $m$ would come to rest with their forward edge portions in under the nozzles, as indicated in Fig. 8. Then as pawl 48 moves idly back over ratchet 46 preparatory to a succeeding feeding stroke, pawl 58 comes into play on ratchet 45 and moves the trays during the idle movement of pawl 48 by a distance sufficient to carry the desired part of the mold $m$, as the part $z''$, across the stream of material issuing from the nozzles $s$. The extent of mold $m$ which it is desired to cover may be readily varied simply by varying the throw of the pawl 58 by the means provided for this purpose. That is, the dimension $z''$ may be decreased or increased at will to permit the size or weight of the molded pieces to be varied without in any way varying the mold equipment.

As to the coördination of the described mold feeding mechanism with the depositing mechanism, this is effected as to depositor D by actuating both mechanisms from a common power shaft 15. That is, the feeding movement of depositor D, for example, takes place during one-half revolution of shaft 15, and the mold feeding mechanism is so actuated from shaft 15 that the movement of ratchet 45 by pawl 58 must necessarily occur during this same half revolution and thus during the feeding movement of depositor D. Similarly, the operation of ratchet 46 by pawl 48 is made to occur during the other half revolution of shaft 15 and thus while the pistons $p$ are ascending. As to the feeder F, the feeding element thereof, the carrier wheel 27 is synchronized with the mold conveyers by the simple expedient of driving the former from the latter. Suitable gearing is provided, as described, to properly proportion the movement of the carrier relatively to that of the molds so that material is dumped from pockets $z$ during the passage of the mold thereunder, and at no other time.

The operation of the machine will now be described. Assuming that the parts occupy the relative positions illustrated, the feeding movement of depositors D and feeder F has been completed. Continued rotation of shaft 15 will, by reason of eccentric 25, raise the pistons $p$, and at the same time pawl 48 will be oscillated in a clockwise direction to move the ratchet 46 sufficiently to cause the tray $t$ to be moved so that the forward edges of the next succeeding row or molds $m$ of one tray are brought to rest in under nozzles $s$ and those of another tray in under the feeder F. No feeding, either from depositor D or feeder F, will occur during the clockwise oscillation of pawl 48. On the next half revolution of shaft 15, pawl 58 will be oscillated in a clockwise direction to move ratchet 45 sufficiently to drag the molds $m$ forwardly to the desired extent. During the actuation of ratchet 45 by pawl 58, the pistons $p$ descend and expel material from nozzles $s$ into the molds moving thereunder and simultaneously other material, as nuts, are dropped from the carrier wheel 27 of feeder F into other molds traveling under the wheel. The parts are then in the illustrated position and further movement of shaft 15 will cause pawl 48 to move the trays $t$ that portion of the step $y''$ remaining after the operation of pawl 58.

Preferably also, each row of molds is elevated toward the depositor nozzles $s$ at substantially the start of the feeding movement of the depositors and later lowered at or near the end of such feeding movement. This is effected in proper synchronism with the movement of pistons $p$ by the described cam 14 which is driven from the same shaft which actuates the pistons $p$. While the use of the means for elevating the molds is not essential, according to all features of the invention, it is advantageous in assisting to spread the material, such as chocolate or the like, in the molds. The lowering of the molds at or near the end of the feeding movement of depositor D, although not essential for all purposes, is desirable in that it effects a quick cut off of the material. This material, usually chocolate, tends to string out and the strings may become deposited on the trays between the molds or may produce undesirable irregularities in the molded pieces themselves. The lowering of the molds at substantially the time mentioned, however, results in a drawing out and breaking off of the string and a desirable quick cut off to avoid the difficulties set forth.

A most important feature of the invention is the means for advancing the molds during the feeding intervals of the depositor and nut feeder, in combination with the special sheet forming nozzles $s$. This feature is particularly advantageous when material, such as chocolate and the like, is to be molded. Chocolate, when at the proper molding temperature and consistency, tends to pile up in the mold and where, as here, the molds are relatively large in width with relation to the nozzles $s$, some means are necessary to spread the chocolate over the molds. By providing the sheet forming nozzles, the lateral spread is obtained, and by providing a relative movement between the nozzles $s$ and molds $m$, during the interval in which chocolate is delivered from the nozzles, the desired longitudinal spread is obtained. The chocolate is thus made to take the shape of the mold rather than piling up in one particular part thereof. This improvement is likewise desirable where nuts, or the like, are to be molded with the chocolate for without the spreading action the nuts would not become uniformly mixed in the chocolate.

The invention also provides a most desirable arrangement, whereby molded pieces of various sizes and weights may be formed in the same mold. As has been pointed out the movement of the mold during the feeding movement of either depositor can be varied as desired to cover the entire length of the mold or any fraction thereof. This may be accomplished by varying the throw of pawl 58 and by changing the original setting of the molds m with relation to nozzles s. That is, the latter may be originally located just at the forward edge of a mold or at any desired distance rearwardly from such end. Thus, the material may be spread over any desired part of the mold and by regulating the quantities of material discharged from the depositors, molded pieces equal in volume to the volume of the mold or any desired fraction thereof can be obtained. The regulation of the quantities discharged from feeder F can be obtained by adjusting screws 32 and the regulation, as to depositor D, can be effected by moving link 22 in slot 26 of lever 23. According to this feature of the invention, the product from the same mold equipment may be readily varied in size or weight, as desired, and this is important in that the necessity for a large and expensive equipment of molds of various sizes is eliminated.

The invention has been disclosed herein in a single form for illustrative purposes, but many other forms and arrangements will readily suggest themselves to those skilled in the art, having for their object the use of the invention in a form different from that disclosed. It is therefore desired to have the scope of the invention determined by the appended claims interpreted in the spirit of the present disclosure, rather than in the letter of the specific form herein disclosed.

What I claim is—

1. In a molding machine, depositing mechanism, including a member having an outlet substantially as long as the molds are wide and from which material may be periodically delivered and laterally spread in the molds, mold feeding mechanism operable to intermittently move the molds so that one mold is moved out of and a succeeding mold is moved into such relation with said outlet as to receive material from the latter, and means to effect a relative movement between said outlet and molds in the line of travel of the latter during the interval of delivery of material from said outlet.

2. In a machine for molding bars of chocolate and the like, a depositor having a sheet forming nozzle from which chocolate may be periodically delivered and laterally spread in the molds, mold feeding mechanism operable to intermittently move the molds so that one mold is moved out of and another into such relation with said nozzle as to receive chocolate from the latter, and auxiliary mechanism to move the molds in their line of travel during the delivery interval of said nozzle, whereby the chocolate may be spread longitudinally in the molds.

3. A machine for molding nuts or the like in chocolate or similar material, comprising a depositor for chocolate including a sheet forming nozzle from which chocolate may be periodically forced and spread laterally in the molds, means periodically operable to feed nuts or the like to the molds before the chocolate is deposited therein, mold feeding mechanism intermittently operable during the non-delivery intervals of the depositor and feeder to move the molds so that one mold is carried out of and a succeeding mold is carried into such relation with both said feeder and said nozzle as to receive material therefrom, and auxiliary mechanism intermittently operable during the delivery intervals of the depositing mechanism to effect a relative movement between said molds and both feeder and nozzle in the line of travel of the molds, whereby both nuts and chocolate may be spread in the molds and the nuts uniformly mixed in the chocolate.

4. In a molding machine, a depositing mechanism including a sheet forming outlet from which material may be intermittently delivered and spread laterally in the molds, mold conveying mechanism to successively carry molds into coöperative relation with said outlet, intermittently operable driving means for the conveying mechanism capable by itself of advancing the molds step by step by increments corresponding with the longitudinal spacing of the molds, and other driving means for said conveying mechanism operable during the intervals of rest of the first-named driving means and during the delivery intervals of the depositing mechanism to successively advance the molds part of the distance by which they would otherwise have been advanced by the feeding means.

5. In a molding machine, a depositor having a sheet forming outlet, means to actuate the depositor to intermittently deliver material from said outlet, a member having a series of longitudinally spaced mold recesses, feeding mechanism to move said member in a series of steps beneath the outlet, alternate ones of said steps coresponding substantially to the desired longitudinal extent of the molded article, and mechanism to coördinate the actuating means and feeding mechanism so that said last-named steps occur during the delivery interval of the depositor and so that the other steps occur during the non-delivery intervals of the depositor.

6. In combination with an intermittently operable depositing mechanism, conveying means to successively carry a series of longitudinally spaced molds into such relation with said mechanism as to receive the material delivered therefrom, a ratchet to actuate said means, a pawl for said ratchet capable of moving the latter on its driving stroke so that the molds will be advanced by increments corresponding with the longitudinal spacing of said molds, a second ratchet connected to turn with the first-named ratchet, a pawl for the second ratchet operable so that its driving stroke occurs during the idle stroke of the first-named pawl and arranged to turn its ratchet so that each mold will be advanced part of said increment before the first-named pawl comes into play, whereby the first-named pawl is effective to move each mold the remainder of said increment only, and means to vary the stroke of said pawls the one independently of the other and without changing the position of the pawls with relation to their ratchets.

7. In combination with a depositor having operable means to intermittently deliver material therefrom, a power shaft to actuate said means, a conveying means to carry a series of longitudinally spaced molds beneath the depositor, two ratchets connected so that each will turn the other and either will actuate the conveying means, a pawl for one ratchet connected with said shaft for operation therefrom in coördinated relation with said delivery means, so that the driving stroke of the pawl occurs during the non-delivery intervals of the depositor, said pawl having a stroke sufficient to cause a movement of the molds equal to the longitudinal spacing thereof, a second pawl so operable from said shaft that its driving stroke occurs during the idle stroke of the first-named pawl, said pawl having a stroke such as to cause a movement of the molds less than that effected by the first-named pawl, the second pawl arranged to move both ratchets during the idle stroke of the first pawl a part of the amount by which they would otherwise have been moved by the first-named pawl, and means to vary the stroke of said pawls the one independently of the other and without changing the position of the pawls with relation to their ratchets.

8. In a molding machine, depositing mechanism having an outlet substantially as long as the molds are wide and from which material may be periodically delivered and laterally spread in the molds, mold feeding mechanism operable to intermittently move the molds so that one mold is moved out of and a succeeding mold is moved into such relation with said outlet as to receive material from the latter, means to effect a relative movement between said outlet and molds in the line of travel of the latter during the delivery of material from said outlet, and means to successively move each mold toward the outlet of said member at substantially the start of said delivery interval and to withdraw it from such portion at substantially the end of such interval.

9. In a molding machine, a depositor intermittently operable to deliver a measured quantity of material, a member having an outlet substantially as long as the molds are wide and through which the material is delivered and laterally spread in the molds, mold feeding mechanism operable to intermittently move the molds so that one mold is moved out of and a succeeding mold moved into such relation with said member as to receive material therefrom, means to effect a relative movement between the member and the molds in the line of travel of the latter and during the delivery interval of the depositor, whereby the material may be spread longitudinally in the molds, means to vary the extent of said relative movement, and means to vary the measured quantity of material delivered from said depositor.

ALONZO LINTON BAUSMAN.